United States Patent [19]
Johnson

[11] 3,894,316
[45] July 15, 1975

[54] INTERLOCKING PAIRED PLATE FASTENERS

[75] Inventor: Arthur F. Johnson, Northbrook, Ill.

[73] Assignee: National Ceiling Corporation, Morton Grove, Ill.

[22] Filed: Sept. 4, 1973

[21] Appl. No.: 393,713

[52] U.S. Cl. .......................... 24/73 SM; 52/758 D
[51] Int. Cl. .................... A44b 21/00; F16b 5/00
[58] Field of Search ........ 52/760, 758 D; 24/73 SM, 24/73 BP, 73 PP, 43 LP

[56] References Cited
UNITED STATES PATENTS

| | | | |
|---|---|---|---|
| 2,820,533 | 1/1958 | Mount | 52/758 D |
| 3,036,673 | 5/1962 | Santerre | 52/758 D |
| 3,182,941 | 5/1965 | Seckerson | 24/73 BP |

*Primary Examiner*—Donald A. Griffin
*Attorney, Agent, or Firm*—Callard Livingston

[57] ABSTRACT

Fastening means useful in assembly of pre-formed sheet metal and like components, and comprising elongated plate elements in mating pairs having mutually interengaging lateral tang, protuberance, and slot formations cooperative in a manner such that the plates can be joined in an initial interfit disposing them for further forcible shifting movement in a particular direction bringing them into a predetermined fully set condition and side by side clamping juxtaposition to clamp upon flange and like planar parts to be seized therebetween. The plate formations further include wedging formations operative to tilt the plates one relative to the other in the fully set condition, together with interlocking formations including a protuberance on one plate which is entered into and captured in an opening in the other plate to restrain reverse movement of the plates from such fully set condition.

12 Claims, 9 Drawing Figures

INTERLOCKING PAIRED PLATE FASTENERS

The disclosed improvements provide a novel form of the fastening means of the clamping-plate type particularly suited, but not limited, to the joinder of prefabricated sheet metal parts and the like into an assembled form or configuration such as a box or coffer or mostly any assembly of components having relatively thin-walled flange or strip parts adapted to be clamped together in face-to-face juxtaposition.

In one illustrative application portrayed hereinafter, the novel fastening means can be employed to join in permanent assembly a set of stamped sheet metal plates defining the four sides of a coffer adapted to be set into a ceiling or like opening to house a set of fluorescent lighting tubes.

Commercially such coffer structures may range from small sizes, such as might be employed for a vent or duct opening and measure as little as one foot along a side, to much more extensive configurations, measuring perhaps five feet or more along a side and adapted to house a set of fluorescent lighting tubes or the like. Such structures may be assembled at the factory and shipped ready for installation, but in many cases it is more economical to ship the components in knocked-down condition for assembly at the job site where joinder of the components may be effected by such expediencies as self-tapping screws, clinch fasteners, rivets, or bolts, all of which involve extra operations, time and cost increments.

The disclosed fastening means is particularly useful for such on-the-job assembly of prefabricated components of the class described by reason of the ease and speed with which the fasteners can be positioned and set without use of special tools or jigs to effect a strong and substantially permanent joinder of the components in a fraction of the time required to set a brace of screws, bolts or rivets at the four or more junctures of a shape such as the simple ceiling coffer depicted in the drawing, FIG. 4.

In accordance with the illustrative application, the parts to be joined are usually pre-punched to provide suitably located apertures to accept the novel fasteners, so that on the job site it is merely necessary to arrange the parts in the intended relationship, apply the fasteners at the joints, and set or lock-in one fastener plate of each pair by application thereto of a light hammer blow in a certain direction to effect the interlock.

More detailed aspects of the novel construction, operation and utility characterizing the invention will appear as the following description of a preferred embodiment thereof proceeds in view of the annexed drawings, in which.

Figure 1:
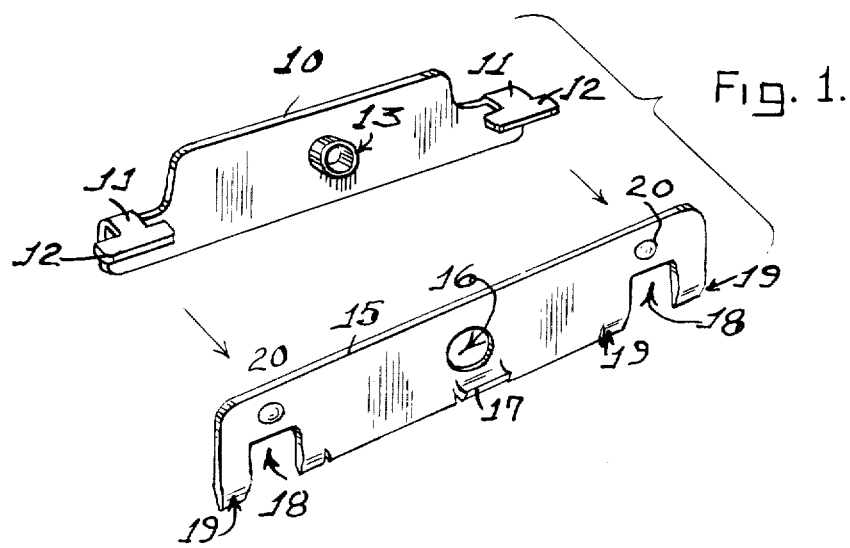
FIG. 1 is a perspective detail of the components comprising one pair of the novel clamp fasteners.

In a preferred embodiment the interlocking fastener plates are employed in complementary pairs having the economically stamped construction depicted in FIG. 1 wherein a first one of the plates 10, also referred to as the tang plate, has laterally-offset interlock tangs 11 spaced apart along its length, for example adjacent the opposite ends thereof, these tangs being provided at their outer extremities with headed portions 12, and may conveniently take the form of a T-head. Disposed between the ends of the first or tang plate of the pair is a lateral protuberance 13 which may preferably take the form of a cylindrical extrusion, the purpose of which will appear hereafter.

A second or locking plate 15 is provided with a central locking opening 16 adapted to receive the extruded locking protuberance 13, and immediately below such opening is a combination starting, guiding and deflecting lip 17 struck out from the lower edge of this plate at an angle of approximately 45° to provide a glide and deflection means operative in the manner illustrated in FIG. 3 to guide and pass the companion plate over the end of this protuberance in setting the plates in interlock, a similar initial relationship of these parts being illustrated in the elevation of FIG. 2. The angled lip 17 also affords a clearance relative to the nose of the protuberance 13 which permits the bevelled portions 19 to be tilted and worked behind the T-heads in the initial assembly of each pair of plates preliminary to driving them into interlock.

Figure 2:
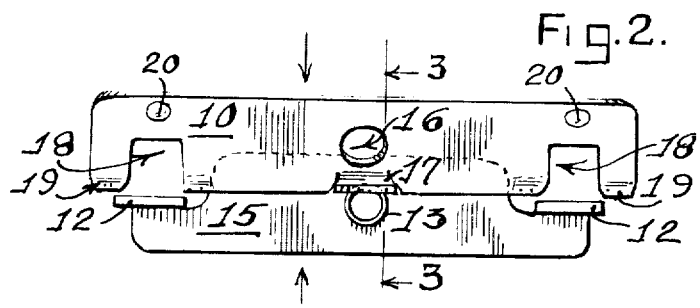
FIG. 2 is an elevational view of the relative positions of the fastener plates brought into initial setting relationship.

Adjacent the opposite ends of the second or locking plate 15, FIGS. 1 and 2, are clearance slots 18 extending upwardly from the lower edge of the plate and of a width to clear the stem portions of the corresponding T-headed tangs when the locking plate 15 is started downwardly, as in FIG. 2, it being particularly observed in both FIGS. 1 and 2 that the lower edge portions of the plate 15 immediately adjoining said clearance slots 18 are relieved or chamfered, as at 19, in order to facilitate gliding wedging action in passage of the tabs behind the T-heads in the setting operation.

Figure 7:
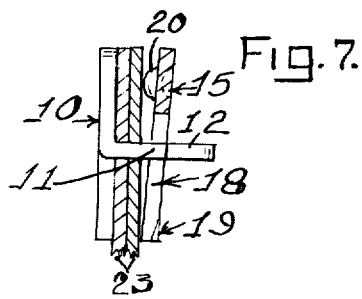
FIG. 7 is an enlarged cross-sectional detail taken along lines 7—7 of FIG. 6 illustrating the wedging action of certain fastener configurations.

Means for increasing the wedging action between the paired fastener plates in fully interlocked condition comprises, as seen in FIGS. 1 and 2, further laterally-offset means in the preferred form of at least two dimples 20 providing laterally-protuberant bosses situated close to the locking slots but upwardly remote from the lower or entering edge of the companion plate so as to exert an increasing wedging action in proportion as the upper plate if forcibly shifted downwardly into final alignment and interlock with the other plate, having regard for FIG. 2 as the starting condition and FIG. 7 as the terminal or fully set condition of the plates.

Figure 4:
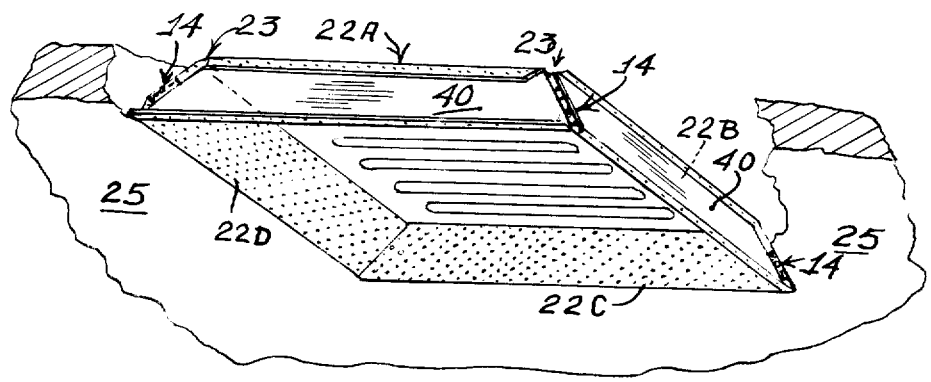
FIG. 4 is a fragmentary perspective view of a ceiling coffer assembled by use of the invention.

In use the operation of the fastening means may be illustrated with reference to assembly of the array of four perforated sheet metal plates 22A, 22B, 22C, 22D comprising the ceiling coffer depicted in FIG. 4, these plates having upset assembly flanges 23 (FIG. 5 also) at their respective meeting margins which are to be juxtaposed and joined by means of the novel fasteners, as generally indicated in FIG. 4 at 14. Such coffers may be shipped with the constituent sets of four plates knocked-down for assembly on the job. When assembled, such coffers are commonly completed by addition thereto of side panels of acoustic tile or panelling (as at 40) which will be set into the longitudinal marginal flanges against the perforate plane faces of the respective coffer plates with the entire coffer assembly then finally set into position in a suitable opening in a ceiling or subceiling 25.

Figure 5:
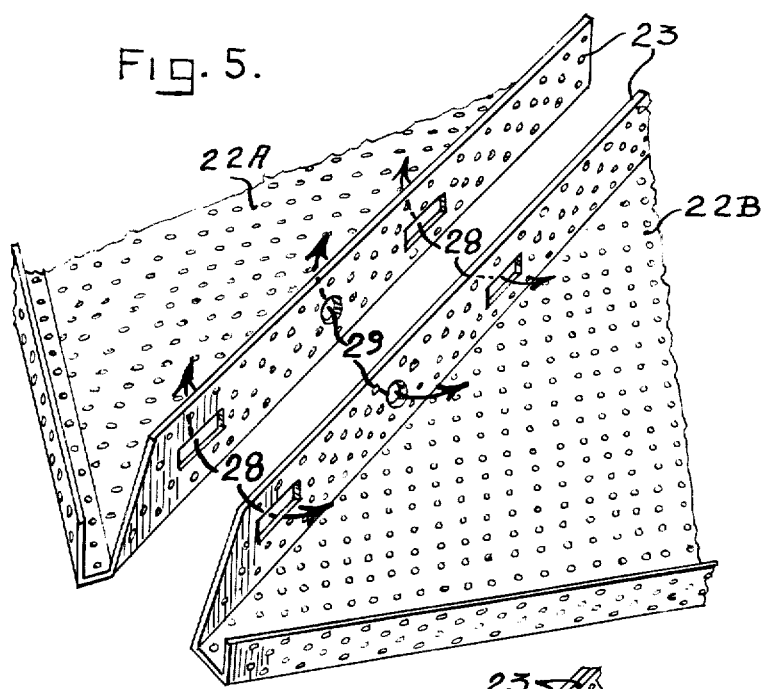
FIG. 5 is a greatly enlarged fragmentary perspective detail of juxtaposed corner flanges of an adjoining pair of coffer plates showing pre-punched fastener openings.

The flanged form of the coffer plates to be joined is shown in the detail of FIG. 5 wherein the upset flanges or meeting edges 23 of two juxtaposed plates 22A and 22B are seen to be provided with pre-punched openings or slots to receive fastener parts and comprising preferably a pair of elongated rectangular slots 28 punched into each plate flange and spaced to pass the T-headed tangs 11, together with intermediate holes 29 to pass the extruded interlock protuberance 13.

Figure 3:
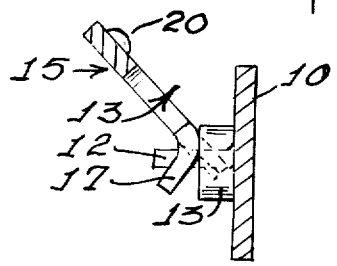
FIG. 3 is an enlarged cross-sectional detail along lines 3—3 of FIG. 2 illustrating certain guide means and deflecting action.
Figure 6:
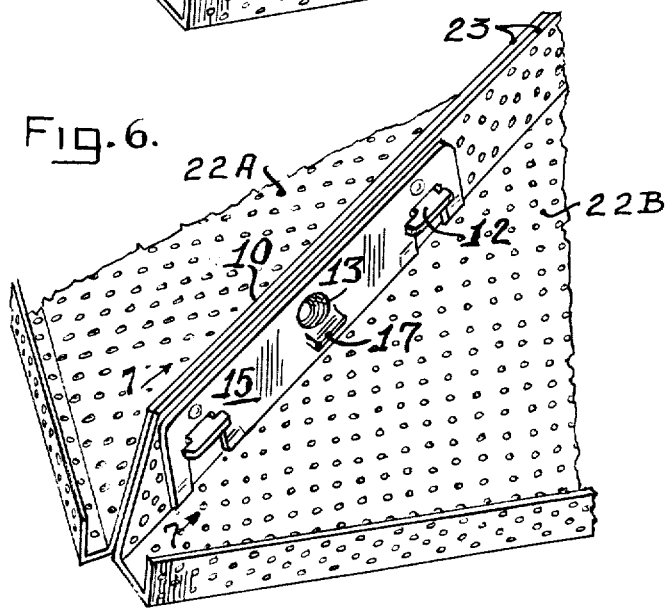
FIG. 6 is a view substantially like that of FIG. 5 with the coffer plates joined and fastening means set home in full interlock.

When the coffer plates or other members to be joined are juxtaposed with their respective fastener openings in alignment, as in FIG. 5, and brought together, as in FIG. 6, one of the fastener members 10 is placed on the far side of the flange of one plate with the T-headed tangs and protuberance passed through the respective registered openings 28, 29, and the companion fastener plate 15 applied on the opposite or near side and started by downward movement, as in FIG. 2, until the deflecting tab 17 bears against the end of the cylindrical protuberance 13, as in FIGS. 2 and 3, whereupon a slight hammer blow applied at about the middle of the second plate will cause the latter to snap home beyond the protuberance into the conditions seen in FIGS. 6 and 7, it being important to observe that in this homing and setting movement, the lateral wedging formations or bosses 20 exert an increasing wedging action as the driven plate 15 moves past the nose of the protuberance and then snaps the latter into the central locking hole 16 by which the assembly is then substantially permanently secured against separation.

In the setting action of the plate 15 last described, there are three pressure points at which the wedging forces develop: one behind each of the T-heads and one in the middle at the nose of the locking protuberance 13. The clearances provided behind the tangs are preferably such that there is a tendency to spring or bow the plate 15 slightly upon the nose portion of 13 as a central fulcrum in driving this plate home, and it will be understood accordingly that the empirical dimensions in respect to such clearances and the thickness and hardness of the metal or other stock, will preferably be such as to permit limited deflection for such purposes. In this connection, the clearances afforded by the chamfers 19 and the lip 17, as previously mentioned, permit tilting the lock plate 15 to start it, as in FIG. 3, so that these wedging forces act increasingly, with the added action of the dimples 20, as the plate 15 is driven into locked condition.

However, should it be necessary to release any set of fastener plates, it is possible to do so by wedging a screw-driver or the like centrally in between the plates to spread them sufficiently to permit the end of the cylindrical protuberance to escape and work away from the hole 16 in a reversal of the foregoing setting action. To this end, the length of the protuberance relative to the thickness of the metal and clearances allowed behind the T-heads and the clearance at the guiding tab 17 may be empirically selected to make such releasing action possible with minimal distortion or deflection of the two plates, as otherwise deformation or mutilation of the clamped members might result. Conversely, it is possible to fabricate the set of plates with the clearances selected to be so close that, once set, the members cannot feasibly be separated without application of excessive force likely to cause substantial deformation or damage.

Figure 8:
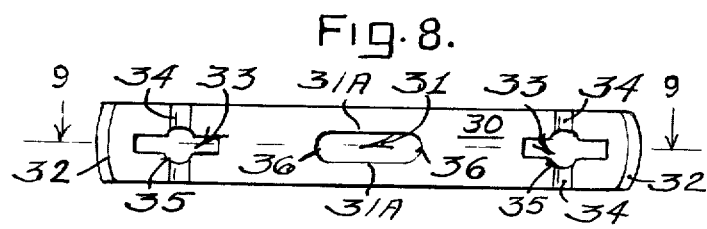
FIG. 8 is an elevational view of a modified form of lock plate suitable for longitudinal setting movement.

It will be observed that the direction of forced displacement to lock or set the first-described embodiment of the fastening means is crosswise relative to the length of the set of plates. Such a lateral setting action is possible and particularly convenient in joining forms having fully exposed mating flange configurations, such as depicted at 23 in FIGS. 5 and 6. However, there are other prefabricated structures which may not permit such a lateral shifting of the plates, but which will permit a longitudinal movement, and in such cases the construction may be modified and for example the form of locking plate 30 shown in FIG. 8 may be employed, this modification providing an elongated central slot 31 to receive the locking protuberance 13 of the tang plate 10 while permitting longitudinal shifting relative thereto. Opposite end portions of the plate 30 may be offset to provide tabs 32 suitable for manipulation and to receive the setting blow.

Flanking the central slot 31 are two longitudinally-elongated tang slots 33, each of a length just barely permitting forced clearance over one of the T-heads on tangs 12, provided the other slot is first fitted fully over its corresponding T-head, each of these slots being preferably provided about midway between its ends with a lateral enlargement 35 so that the resultant configuration is approximately a form of keyhole slot serving to facilitate manipulative motions of this plate relative to the tang plate in the initial joinder of the pair of plates.

Figure 9:
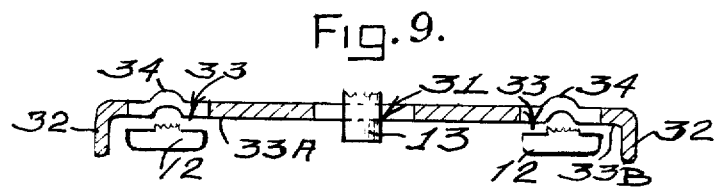
FIG. 9 is a section taken along lines 9—9 of FIG. 8.

After the T-heads have been worked through the keyhole slots, assuming, as before, that there will be a suitable thickness of metal flange or other joined components to be clamped in between these plates, a slight hammer blow directed endwise against one of the offset end tabs 32 will drive the lock plate 30 lengthwise until it is locked at both ends beneath the cross bar portions or T-heads of the tangs 12, this setting displacement being preferably limited by empirically predetermined location of the margins 36 of the elongated central slot 31 to a position in which portions of each keyhole slot, as at 33A and 33B, FIG. 9, are respectively disposed or caught beneath a part of the corresponding T-head when the end margin 36 of the elongated slot 31 is against the protuberance 13, thereby preventing separation of the pair of plates in a direction mutually outwardly of the common clamping plane lying between them.

As with the first-described embodiment, the modified locking plate structure produces a wedging clamp action due to the laterally-protuberant ridge formations 34 which cause the pair of interlocked plates 10 and 30 to assume a wedged relationship very similar to that shown in FIG. 7; however, only those half-portions of the respective ridges 34 which lie above the notched parts 18 in plate 10 are significantly effective in this wedging action, the ridges being extended, nevertheless, entirely across the plate 30 in order that the latter shall be readily reversible, end-to-end, so that it does not matter which way the locking plate 30 is turned endwise in fitting it into initial assembly or joinder with the companion tang plate.

The wedging embossments or configurations in both embodiments augment the wedging and clamping action by causing a tilting of part of one plate toward the other, using inner margins of the T-heads which are proximate to the appertaining plate as a fulcrum in so doing. By providing a slight taper to such proximate margins of the T-heads increasing in the direction of shifting movement into fully set condition, the wedging action can be made to increase markedly as the plates come into fully set clamping juxtaposition.

By shifting the modified lock plate 30 lengthwise from its initial assembly interfit with the companion plate, it becomes caught or captured behind the tang heads 12 as in the case of the first-described embodiment of FIG. 1, which will likewise produce the wedging effect particularly where the wedging taper is provided on the T-heads, there being usually, however, sufficient compressibility or yield to clamping action on the seized parts to render the wedging effect operative in both embodiments without taper on the proximate margins of the heads as aforesaid.

The interlock afforded by the disposition of protuberance 13 in the recessed portions or holes 16, 31, tends to restrain unintentional reverse displacement from fully set clamping juxtaposition of the plates. In the case of the construction of FIG. 1, the protuberance tends to snap into the receiving hole whereas the margins of the hole 31, centrally, as at 31A, fit tightly with the protuberance 13 which tends to produce a sort of detent action when shifted toward the ends of this slot which are slightly widened for the purpose to a degree too small to be accurately depicted in the drawing thereof.

It is to be understood that the set of fastening plates comprising each pair in either embodiment need not be confined to the narrow elongated overall configuration illustrated, but may assume square, round, oblong, or other shapes suited to the intended use and shape of the parts to be joined, and may be modified in other respects without departing from the scope of the invention as defined in the appended claims.

I claim:

1. Clamping type fastening means comprising a pair of elongated plates having respective lateral tang formations and correspondng slot formations interengaging in an initial side-by-side assembly interfit of the plates which disposes the latter for shifting movement one relative to the other in a particular setting direction into a predetermined fully set assembly condition of side-by-side juxtaposition confronting and converging upon a common clamping plate therebetween to seize relatively flat members therebetween, said plates having wedging means operative responsive to said shifting movement to effect convergence and seizure as aforesaid.

2. Fastening means according to claim 1 further characterized in that said tang formations each include a stem portion projecting laterally from the appertaining plate and an end portion terminating in a T-head extending in approximate parallelism with the body of said appertaining plate, and said slot formations are elongated to a degree permitting both interfit with corresponding T-head formations in said initial assembly and movement into the aforesaid fully set condition wherein portions of one plate adjoining said slots are caught behind the headed portions of the tangs in the other plate responsive to relative shifting movement thereof into fully set condition and clamping juxtaposition as aforesaid.

3. The construction of claim 2 further characterized in that said tangs comprise a stem portion projecting laterally from the appertaining plate and terminating in a T-head extending in a direction approximately parallel to the length of such plate, and the cooperative slot means in the other plate are elongated in a direction laterally thereof and open into one of the longitudinal margins of such plate whereby said slots respectively fit over the stem portions of corresponding tangs in initial interfit and setting movement as aforesaid.

4. The construction of claim 3 further characterized in that marginal portions of said slots subjoining said longitudinal margins of the appertaining plate are bevelled to afford a lead-in surface engageable behind the T-heads of corresponding ones of said tangs to facilitate assembly of the plates in said initial interfit.

5. Fastening means according to claim 1 further characterized by the provision of interlock means in the form of a lateral protuberance on one plate and a receiving recess therefor on the other plate and both so positioned that the end of the protuberance and receiving recess are out of alignment in said initial interfit and are brought into interfitting alignment on movement of the plates into said fully-set condition, the end of the protuberance bearing glidingly against the side of the other plate in such initial interfit and movement, and the length of the protuberance being such as to require application of force of predetermined sensible degree to move said other plate over the end of the protuberance for entry into the recess, as aforesaid, in which condition the plates become interlocked and a comparable reverse force is required to separate the plates.

6. The construction of claim 5 further characterized by the provision of a lead-in and glide means on that particular one of the plates which has the recess for receiving the protuberance, and means comprising an offset integral lip portion struck out at an angle from the body of said particular plate subjacent said recess and directed to afford guided and gliding passage of the end of the protuberance in forced movement into the recess as aforesaid.

7. Fastening means according to claim 1 further including wedging means in the form of at least one integral lateral projection from a side of one plate which is proximate to the confronting side of the other plate in fully set condition and situated relative to said tangs acting as a fulcrum to effect a tilting of one plate in a direction toward the other and augment clamping action of the plates upon seized members as aforesaid.

8. Clamp type fastening means comprising elongated plate members in pairs, a first plate having at least two laterally extensive tangs terminating at respective outer ends in a headed portion; a second plate having spaced tang-engaging slots respectively opening into a longitudinal edge of the appertaining plate, said second plate having a tubular locking protuberance extending laterally therefrom in the direction of said tangs at a position along the length of the plate which is approximately midway between said tangs, said protuberance having an end portion situated at a distance from the appertaining plate to bear against the confronting side of the first plate in an initial condition of interfit assembly of the plates wherein said tang receiving slots are started behind the headed portions of the correspondingly situated tangs and in which initial condition of interfit assembly the length of the protuberance is such as to require a substantial forcing of one plate relative to the other in a direction toward a predetermined fully set condition wherein said plates are disposed in substantial side-by-side clamping juxtaposition relative to a common clamping plane therebetween; said second plate having a locking recess situated such that said end of the protuberance enters and becomes captured therein as the result of the aforesaid forced movement into said fully set condition.

9. Fastening means according to claim 8 further provided with an angularly projecting lip in the said longitudinal edge of the plate which affords a lead-in relief and gliding surface for passage of the end of the protuberance in the locking recess.

10. Fastening means for assembly of prefabricated sheet metal components comprising a pair of complementary elongated plate members a first one of which has opposite end portions offset laterally to provide spaced tangs, each tang having an end portion enlarged to define an interlock head, the second one of said plate members having adjacent opposite ends thereof tang-receiving slot means adapted as the result of an initial assembly interfit of the plate members to interfit with a corresponding one of said tangs, said plate members being further shiftable one relative to the other into a fully set condition following such assembly interfit in a manner such that portions of the second plate member subjoining said slot means become firmly caught behind the interlock head portions of appertaining tangs; at least one of said plate members being provided with wedging means operative at least in said fully set condition to cause portions of one plate member to be forcibly displaced toward the other plate member to augment clamping action thereof.

11. Fastening means of the class described comprising a pair of clamp plates having respective lateral projections and cooperative structural configurations adapted for initial interfit with the plates in side-by-side initial joinder and clamping confrontation relative to a clamping plane and an object to be seized therebetween, and further arranged and constructed for shifting movement of one plate relative to the other from said initial interfit condition and joinder in a direction substantially parallel to said plane and operative to produce a resultant forcible wedging convergence of said plates one toward the other into a predetermined final clamping relationship for forcible seizure of said object.

12. A fastening means according to claim 11 further characterized in that the said projections and configurations include mutually interlocking protuberance and slot formations on the respective plates which become forcibly interengaged as the result of said initial interfit and a relative movement of said plates which is in a direction approximately at right angles to the said shifting direction, whereby said plates become interlocked in said condition of initial joinder but remain shiftably movable one relative to the other in said shifting direction for movement into final clamping relationship as aforesaid.

* * * * *